United States Patent [19]

Kaneko et al.

[11] Patent Number: 5,770,831
[45] Date of Patent: Jun. 23, 1998

[54] POWER SUPPLY SYSTEM FOR AN ELECTRIC DISCHARGE MACHINE

[75] Inventors: Yuji Kaneko, Yokohama; Tadao Ueda, Sakai-gun, both of Japan

[73] Assignee: Sodick Co. Ltd., Japan

[21] Appl. No.: 564,324

[22] PCT Filed: Apr. 26, 1995

[86] PCT No.: PCT/JP95/00826

§ 371 Date: Dec. 19, 1995

§ 102(e) Date: Dec. 19, 1995

[87] PCT Pub. No.: WO95/29031

PCT Pub. Date: Nov. 2, 1995

[30] Foreign Application Priority Data

Apr. 26, 1994 [JP] Japan ................................. 6-124771

[51] Int. Cl.$^6$ ...................................................... B23H 1/02
[52] U.S. Cl. ........................................................... 219/69.18
[58] Field of Search ............................. 219/69.12, 69.13, 219/69.18

[56] References Cited

U.S. PATENT DOCUMENTS

| | | | |
|---|---|---|---|
| 2,969,482 | 1/1961 | Bruma et al. | 219/69.18 |
| 4,447,695 | 5/1984 | Inoue | 219/69.13 |
| 4,798,929 | 1/1989 | Itoh | 219/69.12 |
| 5,064,984 | 11/1991 | Yamamoto et al. | 219/69.18 |
| 5,572,003 | 11/1996 | Kaneko | 219/69.13 |

FOREIGN PATENT DOCUMENTS

| | | |
|---|---|---|
| 52-19359 | 5/1977 | Japan . |
| 56-27733 | 3/1981 | Japan . |
| 56-163830 | 12/1981 | Japan . |
| 59-232726 | 12/1984 | Japan . |
| 61-260916 | 11/1986 | Japan . |
| 62-152618 | 7/1987 | Japan . |
| 62-208828 | 9/1987 | Japan . |
| 62-287919 | 12/1987 | Japan . |
| 63-260721 | 10/1988 | Japan . |
| 1-240223 | 9/1989 | Japan . |

*Primary Examiner*—Geoffrey S. Evans

[57] ABSTRACT

First power supply circuit 8, second power supply circuit 6, and third power supply circuit 9 are connected to form a power supply unit 5. The first power supply circuit 8 includes a direct current power supply 8A and switching element 8B. The power supply circuit 8 does not include any substantial resistance, and has comparatively low inductance and impedance characteristics. The power supply circuit 6 includes a direct current power supply 6A, switching element 6B, and current limiting resistor 6C. The power supply circuits 6, 8, and 9 are connected to the gap using a cable 11 as a common interconnect. A high frequency alternating current circuit is formed by the power supply circuit 8, conductor 11, coupling transformer 13, and the gap. In this event, switches 6F, 6G, 9F, and 9G, associated with power supply circuits 6 and 9, are opened, and the power supply circuits 6 and 9 are completely disconnected from the above high frequency alternating current circuit. It is preferable that the switches 6G, 6F, 9F, and 9 G be butt-type switch devices which will completely disconnect and connect the power supply circuits 6 and 8. Also, when using the high frequency alternating current, it is desirable to use an appropriate detection device 30 having a photocoupler 35 as the means for detecting the gap voltage.

20 Claims, 4 Drawing Sheets

POWER SUPPLY SYSTEM FOR AN ELECTRIC DISCHARGE MACHINE

FIELD OF THE INVENTION

The present invention relates to a power supply system for an electric discharge machine (EDM).

More specifically, the present invention relates to a power supply system for an electric discharge machine whereby during multiple electric discharge machining steps, multiple power supply circuits may be used simultaneously, or may be selected and used separately as appropriate to obtain a desired workpiece shape.

BACKGROUND OF THE INVENTION

Typically, power pulses are generated in a power supply unit, which is unavoidably positioned at some physical distance from a machining section which includes parts to support the workpiece and mechanical parts which move the tool electrode relative to the workpiece.

To obtain a product wherein the workpiece has a desired shape, machining must be performed with consideration of the accuracy of product shape and of the roughness of the machined surface of the product. Typically, if machining is done at a high discharge energy there will be a large volume of metal chips removed from the workpiece, and machining speed will be fast. On the other hand, when machining is performed at a high discharge energy, there is a tendency for the discharge to cause large craters to form on the workpiece surface and for the machined surface of the product to be rough.

Therefore, electric discharge machining is performed by separating a first machining stage, wherein the material is removed from the workpiece using rough machining, and a second machining stage, wherein machining is performed so as to improve the machined surface. For example, in a wire cut electric discharge machine, in which cutting of the workpiece by electric discharge is performed using a wire electrode as a tool, a "first cut" machining is first performed, wherein the workpiece is cut by a wire electrode at a high electric discharge energy to such a point that the cut pattern does not protrude into the workpiece beyond a desired outline. Next, a "second cut" is performed in which, following a specified path which is offset from the desired profile, the wire electrode and/or workpiece are moved in such a way that the wire electrode moves relative to the cut workpiece, and the machined surface is improved as the remaining material is removed using an electric discharge energy which is smaller than that used in the first cut. Generally, in order to obtain the desired machined surface roughness, multiple second cuts are performed. This is because the smaller the desired roughness of the machined surface and the finer the desired shape, the more difficult it is to obtain the desired machined surface roughness and desired shape in a single machining step. If a better accuracy of the machined surface roughness and shape is attained in the first cut stage, the number of subsequent machining steps can be reduced.

It is known that a wire electrode traveling between a pair of wire guides (upper and lower) under a specified applied tension and at a specified speed will slightly vibrate between the upper and lower wire guides. Because of this undesirable wire electrode vibration, the center portion between the upper surface and the bottom surface of the workpiece will be cut into unduly in the part of the workpiece which faces the wire electrode, resulting in an adverse effect on product shape accuracy. This adverse effect will be appear conspicuously at the final machining stage, in particular. By increasing the energy per unit time supplied to the gap, pressure on the wire electrode from the produced electric discharge can be used to reduce oscillation of the wire electrode. However, a small energy per power pulse is naturally sought, for example, in the above-mentioned second cut. When a smaller energy per pulse power pulse is supplied to the gap, the reduction of the amplitude of wire electrode vibration may be insufficient. In such cases, the peak current value of each power pulse is increased and its ON time shortened, while OFF time is also shortened, resulting in an increase in the power pulse repeating frequency. If this is done, the energy per power pulse is reduced and the energy per unit time increases, so that the amplitude of wire electrode vibration can be reduced without adversely affecting machined surface roughness.

Apart from this, in cases where machining is performed in an aqueous machining fluid, it is well known that corrosion occurs due to electrolysis of the machined surface; this phenomenon is undesirable for the product. It is known that in order to prevent this undesirable electrolytic effect, it is desirable to apply an alternating current power pulse to the gap.

Given these conditions, it is desirable that an electric discharge machine power supply system include a (first) power supply circuit to produce a power pulse having a pulse width of 1~2 $\mu$S (microseconds) and a high current peak value of 500~1000 A during the first cut, a (second) power supply circuit to produce a power pulse with a smaller current peak than that described above for the (first) power supply circuit above, and a (third) power supply circuit to produce a high frequency alternating current pulse during the final machining step of the second cut in order to avoid undesirable electrolytic phenomena on the product while effectively suppressing the above-described wire vibration. A mutual effect between the high frequency alternating current circuit and the multiple other power supply circuits may be assumed when this type of power supply circuit configuration is adopted — in other words when the high frequency alternating current circuit is connected to multiple other power supply circuits.

The object of the present invention is to provide, in a power supply system which performs multiple cuts making selective use of multiple power supply circuits and high frequency alternating current circuits, a machining device which takes maximum advantage of the machining characteristics of a high frequency alternating current circuit, eliminating the effect of the multiple other power supply circuits on the high frequency alternating current circuit.

Also, machined surface roughness can be improved with a minimum number of cuts and damage to the machined surface due to electrolytic corrosion can be prevented, while undue erosion due to vibration of the wire electrode is also prevented.

Other objects of the present invention will be partially described in the explanation which follows, and will be partially apparent to practitioners of the art through implementation of the invention.

SUMMARY OF THE INVENTION

In order to achieve the above objectives, the power supply system of the present invention may comprise a first power supply circuit which includes a direct current power supply and at least one switching element, and which generates a direct current pulse; a transformer positioned between that first power supply circuit and the machining gap and including a ring core, which converts the power supply circuit direct current pulse to an alternating current pulse, a primary winding wound around the ring core and connected to the first power supply circuit, and a secondary winding wound around the ring core and connected to the machining gap; a bypass line which bypasses the transformer and connects the first power supply circuit to the machining gap; a first switching means provided between the first power supply circuit and the machining gap, which selectively switches between the transformer and the bypass line; a second power supply circuit connected in parallel to the first power supply circuit and containing a direct current power supply and at least one switching element and series circuit having a current limiting resistor; a pulse generating means which supplies a stream of pulse signals having an ON time and OFF time respectively controlled by the first and second power supply circuits; and a second switching means which connects the second power supply circuit to the machining gap when the first power supply circuit is connected to the gap through the bypass circuit and which disconnects the second power supply circuit from the machining gap when the transformer is connected in the power supply circuit.

It is desirable for the first switching means to include a butt contact type of switch; the second switching means will preferably also include a butt contact-type switch. The first switching means is preferably housed together with the transformer in a single case positioned in proximity to the machining gap. Furthermore, the second switching means is preferably driven based on the signal which commands machining by control of the pulse generation means.

The power supply system may also include a first detection circuit which detects the direct current voltage at the machining gap, and a second detection circuit which detects the alternating current voltage at the machining gap.

It is also desirable that the detection circuit which is connected in parallel to the machining gap and which detects the discharge voltage generated at the machining gap have a photocoupler for converting an electrical input signal to an optical output signal, selectively connectable by means of an ON/OFF switch.

DETAILED DESCRIPTION OF THE PREFERRED EMBODIMENT

The present invention will now be explained with reference to the figures.

Figure 1:
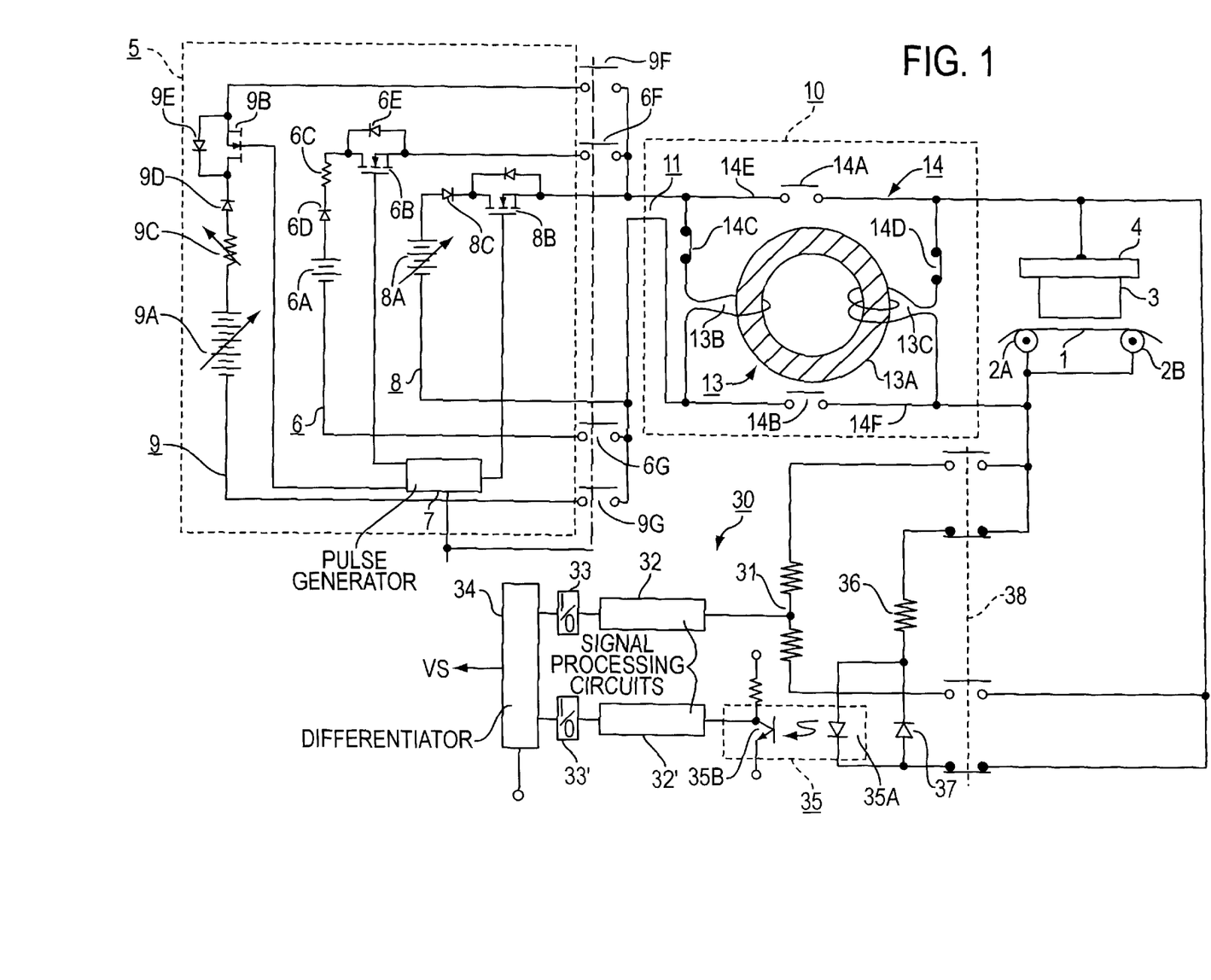
FIG. 1 is an illustration of the overall configuration of a power supply system in the wire cut electric discharge machine of the present invention.

FIG. 1 illustrates an embodiment of the wire cut electric discharge machine power supply system of the present invention.

A wire electrode 1 is stretched under a specified applied tension as it is guided along a specified path by a pair of wire guides 2A, 2B. The wire guides 2A, 2B are also used in this embodiment as electrical supply pieces; they deliver the voltage pulse supplied from a power supply unit 5 to the wire 1.

A workpiece 3 is mounted on a work stand 4 so as to face the wire 1 across a specified clearance. This clearance forms the electric discharge gap. The work stand 4 is affixed to an XY cross table which is not illustrated; it is capable of movement within a plane perpendicular to the axis of the wire 1.

The wire cut electric discharge machine itself may also be equipped with a device for traversing the wire 1, a device for inclining the wire 1 at a specified angle, and a device for supplying a fluid as the electric discharge machining medium. A detailed explanation of these devices is omitted.

The power supply unit 5 includes a first power supply circuit 8 and a second power supply circuit 6. The unit 5 also includes, separate from the above two power supply circuits, a power supply circuit 9.

The first power supply circuit 8 has a direct current power supply 8A and at least one switching element 8B. The direct current power supply 8A may be a variable power supply capable of changing voltage value over a range of about 80~120 V. The (first) power supply 8 also includes a diode 8C for preventing reverse current flow. A diode 8D may also be provided in parallel with the switching element 8B to protect the switching element 8B. More preferably, the switching element 8B is a multiple switching element group in which the switching elements are arrayed in parallel. The (first) power supply circuit 8 does not include a current limiting resistor other than a very small detecting resistor. Thus the power supply circuit 8 contains no substantial resistance and has comparatively low inductance and impedance values. Therefore the rising and falling edges of the direct current pulse which flows from the direct current power supply 8A through the switching element 8B are steep, and suitable for supplying a high frequency direct current pulse to the machine section. The switching element 8B operates in its unsaturated region, and the amplified current pulse peak value is maintained at a fixed value by controlling the ON time of switching element 8B.

The (second) power supply circuit 6 includes a direct current power supply 6A, at least one series-connected switching element 6B and a current limiting resistor 6C connected in series. The value of the direct current power supply 6A may be a fixed voltage value between about 80~120 V. Although not illustrated, the (second) power supply circuit 6 may include multiple circuits connected in parallel in which the switching element 6B and the current limiting resistor 6C are connected in series. The peak current value is determined by changing the number of simultaneously conducting switching elements 6B. The signal which selectively controls these switching elements 6B is sent from a pulse generating device 7. The second power supply circuit 6 may further be provided with a diode 6D to prevent reverse current flow and a diode 6E to protect the switching elements from surge voltages. As the switching circuit 6 has a current limiting resistor, it supplies a smaller peak current value than the (first) power supply circuit 8.

In the embodiment illustrated in FIG. 1, an additional power supply circuit 9 is provided in parallel with the (second) power supply circuit 6 and power supply circuit 8. The power supply 9 includes a variable direct current power supply 9A, which is a higher voltage source than direct current power supply 6A. When the voltage of the direct current power supply 6A is about 80~120 V, the voltage of the variable direct current power supply 9A is about 80~280 V. A switching element 9B, a current limiting resistor 9C, whose resistance value is preferably set to be larger than current limiting resistor 6B, and a reverse current protection diode 9D are arrayed in series with direct current power supply 9A in the power supply circuit 9. Also, a diode 9E for the purpose of protecting switching element 9B is connected in parallel with the switching element 9B. Thus, with respect to power supply circuit 6, power supply circuit 9 has a comparatively high voltage and comparatively low current and capacitance value.

A pulse generating device 7 is a device which outputs a gate pulse for respectively controlling the ON/OFF state of switching elements 6B, 8B, and 9B is provided. The pulse generating device 7 includes a setting device by which an operator can pre-set ON/OFF times and a controller which generates pulses at a prescribed timing based on those settings. Each switching element 6B, 8B, and 9B is ON when a gate pulse is output and OFF when the gate pulse is not being output. The gate pulse is output at a pre-set timing, so the switching elements 6B, 8B, and 9B go ON and OFF at their respective pre-set timings. Therefore a voltage pulse having a prescribed ON time and OFF time is applied to the gap formed between the wire 1 and the workpiece 3, making it possible to source current at the desired peak value.

A coupling transformer 13, which includes a ferrite ring core 13A, primary winding 13B, and secondary winding 13C operates as a conversion means. As illustrated in FIG. 1, the positive side of direct current power supply 6A is connected to one terminal of primary winding 13B, while the other terminal is connected to the negative side. Also, one terminal of the secondary winding 13C is connected to the wire 1 side of the gap, and the other terminal is connected to the workpiece 3 side of the gap.

This type of coupling transformer is appropriate when converting an intermittent high frequency direct current pulse to an alternating current pulse. The cycle of such pulses will have an ON time of approximately 50 nS~1000 nS and an OFF time of 500 nS~several 10's of $\mu$S. This transformer 13 is used when electric discharge machining is done using power supply circuit 8, in particular. As the power supply circuit 8 does not have substantial resistance, and has comparatively low inductance and low impedance characteristics, it is able to easily raise the peak value of the current pulse supplied through switching element 8B which is supplied to the transformer 13.

In order to more closely maintain a desired waveform of the supplied current pulse, the primary winding 13B preferably has the smallest number of windings possible. From the standpoint of the relationship between the obtained alternating current pulse voltage effective [rms] value and the current value, it is desirable that the sum of the windings in primary winding 13B and secondary winding 13C be between 2~4. In the preferred embodiment, the primary winding 13B has one winding and secondary winding 13C has two windings, so the ratio of windings between the primary winding 13B and secondary winding 13C is 1:2; when losses in the transformer are ignored, the winding 13C effective voltage value effectively doubles and halves the current value.

Conductors 11A and 11B are connected between the power supply unit 5 and the transformer 13. The line inductance of the conductors 11A and 11B should be minimized as much as possible so that the rising edge and falling edge of the current pulse which flows through the gap are steep. Coaxial cable or shielded cable may be used for cable 11.

Line inductance should be similarly minimized between transformer 13 and the gap. Since electricity is conducted to the wire 1 when the transformer is connected to the wire 1 or to the workpiece 3, a coaxial cable or shielded cable cannot be used. In such cases, it is best that the transformer be positioned as closely as possible to the machining area; the clearance between the transformer 13 and the conducting portion of wire 1 can be connected using a stranded wire.

A power pulse can be supplied without passing through the transformer 13. The switching device 14, which comprises the first switching means, specifically includes a bypass line 14E which connects the switches 14A, 14B, 14C, 14D and the conductor 11A to the workpiece 3, as well as a bypass line 14F, which connects the conductor 11B and the wire 1. When no high frequency alternating current pulse is being supplied, the pulse is supplied through the bypass lines 14E and 14F to the gap without passing through the transformer 13.

The power supply circuits 6, 8, and 9 are wired within the power supply unit 5, and the conducting wires 11A and 11B to the gap are connected to one another as a common path. When an alternating current pulse is to be supplied from power supply circuit 8 at a high frequency, this pulse may be affected by the power supply circuit 6 and power supply circuit 9 even though they are not used at this time.

First, there is a floating capacitance in the power supply circuits 6 and 9. This floating capacitance frequently affects alternating current pulses at high frequencies. This may cause peak current pulse values at the gap to vary, making it difficult to perform stable machining.

Secondly, the diodes contained in the diode elements and MOS FETs (a type of switching element) in those power supply circuits 6 and 9 require a charge for reverse recovery within a time of 100~200 nS. The current output from power supply circuit 8 therefore flows into power supply circuit 6 or 9 in approximately 50~100 nS. That is why some time is required until the supplied current pulse reaches the desired value. The alternating current pulse which must be supplied through transformer 13 from the power supply circuit 8 in order to attain good performance has an ON time which is particularly short, at less than 2 $\mu$S. The OFF time thereof can also be set from 500 nS to several 10's of $\mu$S. Thus this stream of alternating current pulses will have an extremely high frequency. Therefore even if the aforementioned effect of the reverse recovery charge has a short duration less than several $\mu$S, a large effect will be imparted to the supplied current pulse.

The characteristics of electric discharge machining-using alternating current pulsing at a high frequency could be used to greater advantage than hitherto if the above effects could be removed.

Switches 6F and 6G, which comprise the second switching means, are therefore provided in power supply circuit 6 between the connection points of power supply circuit 6 and power supply circuit 8, as illustrated in FIG. 1. Also, switches 9F and 9G are provided in power supply circuit 9 between the two connection points of the power supply circuit 9 and power supply circuit 8. These switches 6F, 6G, 9F, and 9G are preferably formed not by electrical, but rather by mechanical switches. Switches 6F, 6G, 9F, and 9G are open when power supply circuit 6 and power supply circuit 9 are not used, and a power pulse is supplied from power supply circuit 8, as a high frequency alternating current power pulse supplied through transformer 13. Thus, power supply circuits 6 and 9 are fully switched out when power supply circuit 8 is in use. There is no flow of current output from power supply circuit 8 into power supply circuits 6 and 9 for approximately 50~100 nS. Therefore the current output from power supply circuit 8 is not affected by floating capacitance of power supply circuits 6 or 9, or by the charge used for reverse diode recovery, and the desired current pulse waveform can be obtained. It is clear that this is particularly effective when the pulse width of the gate pulse which turns switching element 8 ON is short, at around 100 nS or, put another way, when it is necessary to supply an extremely high frequency current pulse. In this case, the unused power supply circuits cannot easily be electrically isolated with electronic switches, so it is important, as noted above, that switches 6F, 6G, 9F, and 9G be mechanical switches and, more preferably, butt contact-type switches, in order to accomplish this objective. This is because such switches have a large contact surface, and current loss upon contact is small. Also, such butt contact-type switches can make use of devices such as the switch device 14 in FIG. 4, which will be explained in detail below.

The switches 6F, 6G, 9F, and 9G preferably include relay circuits. When a high frequency alternating current pulse is supplied from the power supply circuit 8 and the transformer 13, the switches 14A and 14B are opened and switches 14C and 14D are closed so as to supply a pulse through coupling transformer 13. At this time, the switches 6F, 6G, 9F, and 9G are open. The relay circuit can, for example, be driven using the machining command signal which controls the pulse generating device 7. That is, when the command signal for performing electric discharge machining by supplying the above described high frequency alternating current pulse is received, the same command signal can also be input to the relay circuit to drive the relay circuit. Thus when high frequency alternating current power pulses are generated, the other circuits are disconnected, and the power supply circuit becomes independent.

FIG. 1 also illustrates an electric discharge detection device 30 connected in parallel with the gap. The detection device 30 is of the type which, by amplifying the potential difference between the two sides of the gap and comparing it to a specified voltage, detects whether the pulse voltage value has dropped after generation of an electric discharge. The illustrated detection device 30 contains two detection circuits. The first detection circuit contains a resistor group 31, a main section 32, and an I/O board 33. The second detection circuit includes a main section 32', an I/O board 33', a photocoupler 35, a resistor 36, and a diode 37, and can detect an alternating current pulse voltage generated at the gap. A differentiating device 34 is commonly used by the detection circuit, and outputs a "begin discharge signal" VS which indicates that electric discharge has occurred, based on the detection signals. The main sections 32 and 32', are signal processing circuits which include an amplification circuit, not illustrated, an integrating circuit, an amplifier circuit having adjustable gain, a sample and hold circuit, and an A/D converter. An electrical signal is converted to an optical signal in photocoupler 35. Therefore light emitting element 35A and light receiving element 35B, which is formed of opto-electric conversion transistors, are completely isolated. Therefore any floating capacitance in the detection circuit will not affect the gap. The diode 37 is connected with a polarity opposite that of light-emitting element 35A. The positive and negative voltage drop in the resistor 36/light emitting element 35A serial circuit are balanced to be equal. Therefore the second detection circuit, into which a photo-coupler 35 is introduced, is able to take advantage of a superior ability to detect a high frequency alternating current voltage.

A switch group 38, which comprises a third switching means, is for the purpose of selectively switching between the above two detection circuits. That is, the first detection circuit, which includes the main section 32, is disconnected from the high frequency alternating current circuit which supplies a high frequency alternating current pulse and which is formed of power supply circuit 8, coupling transformer 13, and the gap. At the same time, the detection circuit which includes main section 32' is connected to the gap.

The above switching means comprises 4 switches, preferably comprised of mechanical switches. Therefore even with a high frequency alternating current pulse, the alternating current voltage at the gap can be detected with virtually no effect on the high frequency alternating current pulse waveform supplied to the gap. When no high frequency alternating current pulse is being supplied, the direct current voltage at the gap is detected. Thus, the first detection circuit containing main section 32 can be connected, and the second detection circuit containing the main section 32' is disconnected from the gap.

Therefore it is possible to supply an alternating current pulse at a more desirable high frequency with virtually no effect from the floating capacitance in the detection circuit on the gap, and machining results better than previously possible can be attained.

Next, the operation of the embodiment illustrated in FIG. 1 with regard to a specific machining process is described.

When machining the first cut, the switches 6F and 6G are closed and the switches 9F and 9G will preferably be opened. The switches 14A and 14B are closed, and the switches 14C and 14D are opened. A gate pulse is supplied to the switching element 6B from the pulse generating device 7, and a pulse is supplied from power supply circuit 6. At this point, the switch group 38 is in a state where the first detection circuit is connected, and the second detection circuit is disconnected. According to the detection signal from the first detection circuit, the differentiating device 34 outputs a start discharge signal VS when the voltage at the gap drops. When the signal VS is input to pulse generating device 7, the pulse generating device 7 supplies a gate pulse of a pre-set duration to switching element 8B. A pulse is then supplied from power supply circuit 8. After the above specified time, the gate pulse to switching-elements 6B and 8B goes off.

The reason in this event for using power supply circuit 6 and power supply circuit 8 is as follows.

As described above, the peak value of the current pulse supplied from power supply circuit 8 is determined by the conductive state of switching element 8B, which is to say its ON time. What is important here, however, is that there is necessarily a delay time between obtaining the start discharge signal VS and the actual turning ON of switching element 8B. Therefore if control is to be based on the duration of a high peak current value, the effect of this delay time will be large. In other words, a small offset causes a large energy differential with each current pulse, leading to a spreading of current pulse values. For this reason, power supply circuit 6 is connected in parallel with power supply circuit 8, and a power pulse is supplied from power supply circuit 6, which supplies a small current value current pulse until discharge occurs.

A high frequency current pulse with a high peak value can be supplied, enabling improved machining speed and comparatively low-roughness machining. Since the first cut can be machined quickly, and the roughness of the machined surface is comparatively low, the subsequent number of machining steps can be reduced and efficiency improved.

In the undesirable condition where the machining gap becomes too narrow, switches 6F, 6G, 9F, and 9C are closed.

The small current value voltage pulse from the power supply circuit 9 is then added to the voltage pulse obtained with power supply circuit 6, and the resulting pulse is supplied to the gap. By so doing, the average voltage value supplied to the gap will be high, thus promoting the occurrence of discharges and making it possible to maintain a wider discharge gap. In this event, no pulse is supplied from power supply circuit 8.

As the initial step when using multiple second cuts, a pulse having a specified ON time and OFF time is supplied from second power supply circuit 6 to the gap. This pulse is a power pulse appropriate to the circumstance, such as when modifying the machined shape formed by the first cut, or when the machined shape is small and a large peak current cannot be used. In this event, no pulse is supplied from power supply circuits 8 and 9.

In subsequent steps using the second cut, the switches 14A and 14B are opened and switches 14C and 14D are closed to connect the coupling transformer 13 into the circuit. At the same time switches 6F, 6G, 9F, and 9G are opened and power supply circuit 9 is disconnected. The switch group 38 is switched so that the second detection circuit, which includes main section 32', can detect the voltage at the polarity-reversed gap. A high frequency alternating current circuit is then formed which supplies a pulse through transformer 13 from the power supply circuit 8 only.

FIGS. 2A, 2B, 2C, 2D, 2E, and 2F are timing charts illustrating the voltage and current pulse waveforms which explain the operation of the present embodiment of the invention and the steps subsequent to the above second cut. In the figures, pulse waveforms based on previous technology are shown using dotted lines for reference.

Figure 2A:
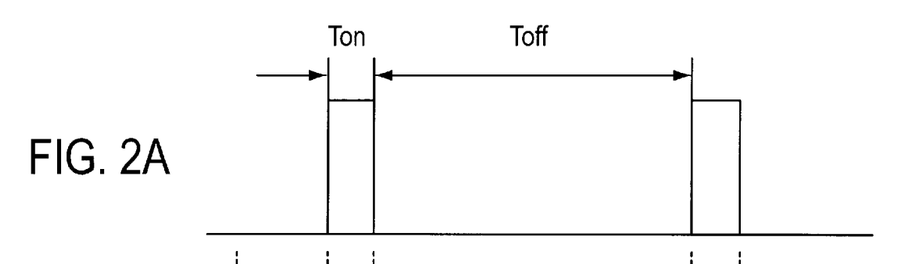
FIGS. 2A, 2B, 2C, 2D, 2E, and 2F are timing charts illustrating voltage pulse and current pulse waveforms for the purpose of explaining the operation of the present invention.
Figure 2B:
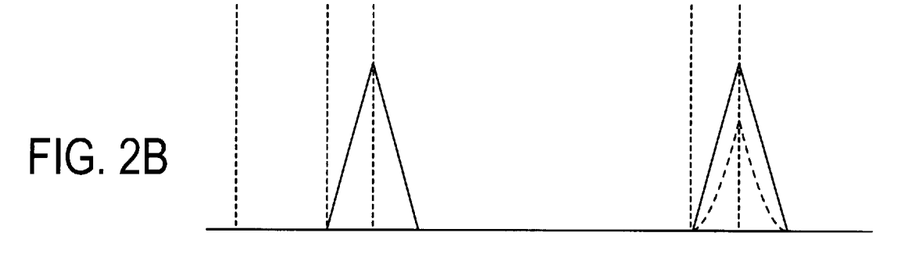
Figures 2C, 2D, 2E:
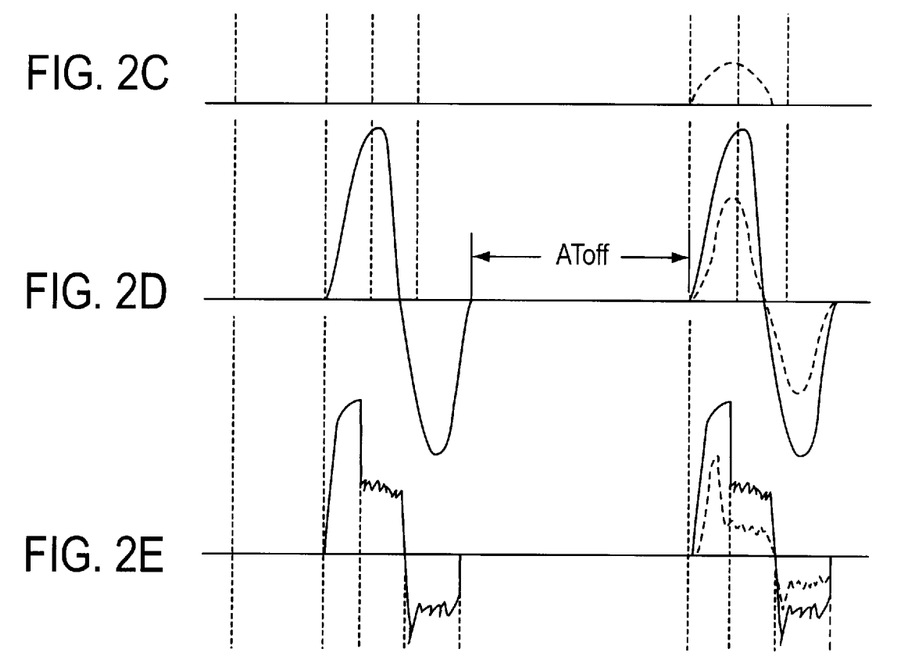
Figure 2F:
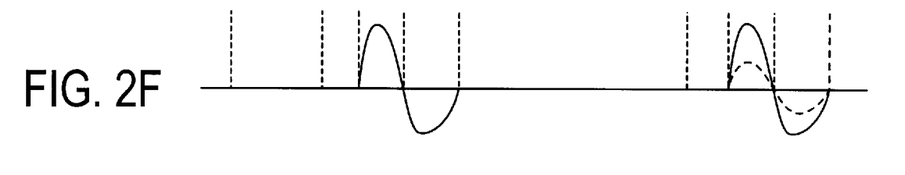

FIG. 2A is a gate pulse, and is the voltage pulse signal supplied to the base of switching element 8B. Switching element 8B conducts when the gate pulse is supplied to its base. Here the ON time Ton is, for example, 100 nS, and the OFF time Toff is, for example, 1 $\mu$S. The high frequency alternating current circuit which includes power supply circuit 8 is formed when switching element 8B conducts. A current pulse such as is shown in FIG. 2B, in which the rising edge and falling edge of the waveform are steep, is then supplied to the primary side of transformer 13. An alternating current voltage pulse as shown in FIG. 2D is induced on the secondary side of coupling transformer 13, and this alternating current voltage pulse is supplied to both poles of the gap. When discharge occurs, breaking down the gap insulation, the gap machining voltage will have a waveform like that illustrated in FIG. 2E. The current flowing through the gap, as illustrated in FIG. 2F, has an extremely narrow pulse width, so the actual energy thereof can be made comparatively small. Meanwhile, the time during which the current pulse flows is about 500 nS, so the OFF time Toff until the next pulse is sourced can be shortened even when the time for recovery of gap insulation, AToff, is considered. Therefore more pulses per unit time can be sourced, and energy per unit time can be increased.

In cases where there may be an effect imparted from the reverse recovery charge from the power supply circuits 6 and 9, without the switches 6F, 9F, and 9G, and with the power supply circuits 6 and 9 connected, a current flows to power supply circuits 6 and 9 for a short period, as shown by the dotted line in FIG. 2C. The current supplied to the primary side of transformer 13 will take longer to reach peak value in proportion to this flow of current. The ON time of the gate pulse is an extremely short 100 nS, so that it will be switched over before reaching peak. In this case, as shown by the dotted line in FIG. 2B, the rising edge and falling edge of the current pulse are comparatively gentle, and the peak value is lower. As illustrated by the dotted line in FIG. 2E, the unloaded voltage is comparatively low. In this event, the current pulse has a smaller value, and there are frequently cases where energy sufficient to perform machining cannot be obtained. Compared to the prior current pulses, the current pulse waveform illustrated in FIG. 2F by would seem to be clearly more desirable from the standpoint of electric discharge machining with an alternating current power pulse at high frequency.

When an electric discharge occurs and current flows through the gap in the manner described above, energy generated at the gap per unit time increases, and the amplitude of vibration on wire I can be reduced. At the same time, because the energy per electric discharge is small, there is no undue worsening of machined surface roughness. Furthermore, because the current flowing through the gap is alternating current, it is difficult for corrosion caused by electrolysis to occur at workpiece 3. However, because the energy per discharge is small, this type of machining requires more time for the whole machining process, beginning with the initial stage, so it should be used selectively according to the objectives of each machining step.

The machining procedure described above is a popular one, but machining is not limited to it, and electric discharge machining can be performed with selective use of power supply circuits and following an appropriate procedure in accordance with machining conditions.

Figure 3:
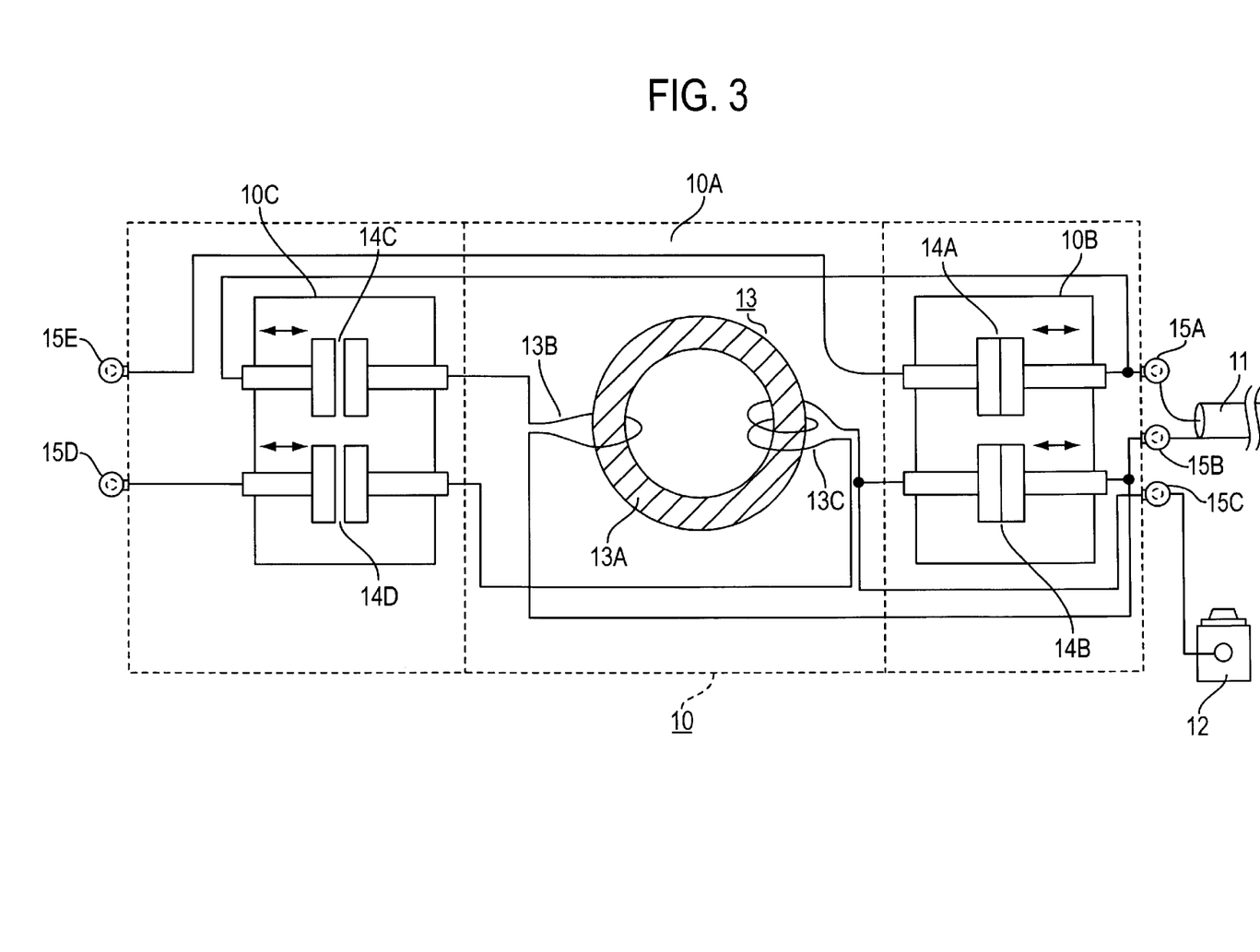
FIG. 3 is an illustration of the switching device and coupling transformer device.

FIG. 3 illustrates a switching device and a coupling transformer device.

The coupling transformer 13 and bypass means 14 are preferably housed in a compact case 10, preferably in the form of a small rectangular box, attached to a work stand 4 supported by a work tank and work pan which are not illustrated. The case 10 is bolted or welded to a guide unit and/or work tank not illustrated, in addition to the edge of work stand 4.

The case 10 has terminals 15A~15E. Terminals 15A and 15B are connected to the end of the cable 11 over the minimum practical distance using, for example, stranded wire. Similarly, terminal 15C is connected using stranded wire to at least one guide unit, for example to the bottom guide unit 12. Terminals 15D and 15 are connected using stranded wire to work stand 4 over the minimum distance. Thus the high frequency alternating current generated in coupling transformer 13 is supplied to the gap formed between workpiece 3 and wire 1 over the minimum practical distance, so a high frequency current can be sourced through the gap.

The case 10 is divided into chambers 10A~10C. Chamber 10B holds switches 14A and 14B as close as possible to terminals 15A~15C. Chamber 10A is adjacent to chamber 10B, and holds the coupling transformer 13. The chamber 10C is adjacent to chamber 10A, and holds switches 14C and 14D, which are positioned as close as possible to terminals 15D and 15E.

Figure 4:
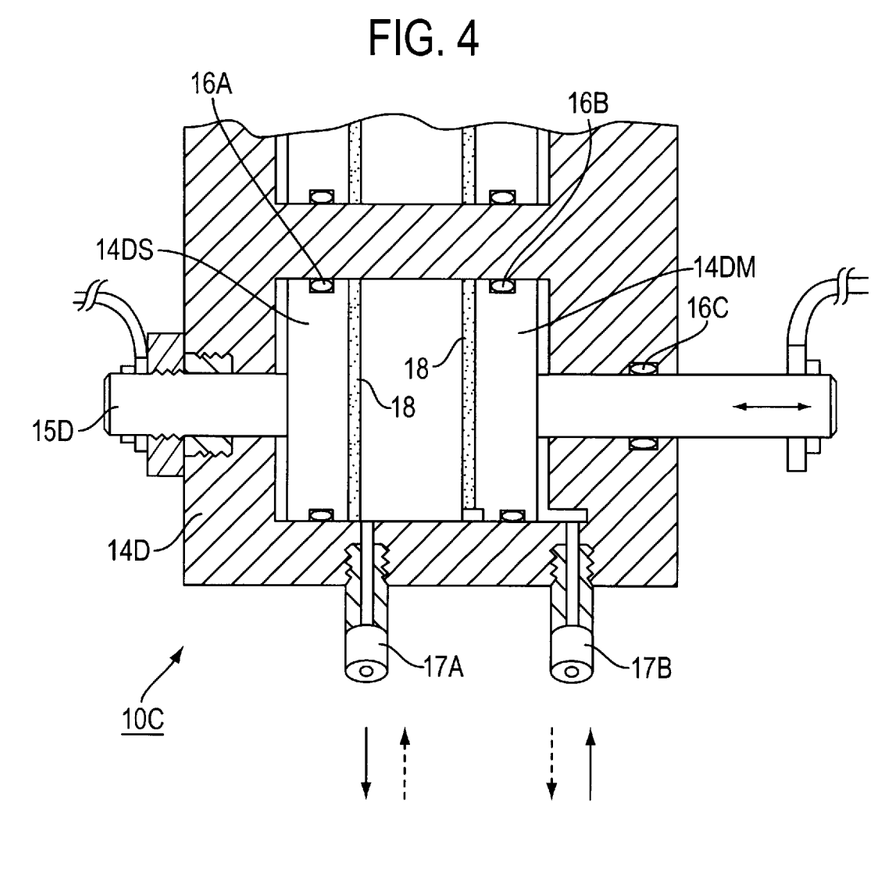
FIG. 4 is a diagram illustrating a detail of the switching device of the present invention.

Next, details of the switch device will be explained with reference to FIG. 3 and FIG. 4.

Switches 14A~14D are switches of the well-known butt contact type. Four sets are provided, each having a non-moving stationary contact having a contact surface and a moving contact having a contact surface designed to move perpendicular to the contact surface of the non-moving contact.

The respective contact surfaces 18 of the stationary contact 14DS and moving contact 14DM in switch 14D are formed so that the high frequency power pulse is favorably conducted. Relative movement of moving contact 14DM with respect to contact 14DS is controlled by the selective supply of a fluid into chamber 10C through either of holes 17A or 17B from a fluid source (not illustrated) outside of chamber 10C. Seals 16A, 16B, and 16C, such as an O-ring, are placed on the appropriate part of switch 14D to prevent fluid leakage.

Surface area and material for the contact surface 18 are selected so that current loss is low and a favorable high frequency power pulse can be supplied. For example, in the embodiment shown this surface area is 150 mm$^2$, and the material is a good electrical conductor base metal plated with silver.

These switches 14A~14D are not electronic, as are the above described switching elements, but are rather mechanical switches in which conducting metal surfaces are designed to contact and separate. Such switches are not affected by the current pulse waveform flowing at the gap.

The object of the present invention is not limited to just the precise forms disclosed; rather it is clear from the explanations above that many improvements and variations are possible. For example, further power supply circuits may be provided in parallel, and multiple switches may be used to disconnect the circuit completely from the high frequency alternating current circuit. The group of embodiments illustrated were selected with the object of explaining the substance and practical application of the invention.

The scope of the invention is to be defined by the appended claims.

What is claimed:

1. A power supply system for supplying machining pulses to a machining gap formed between a tool electrode and a workpiece comprising:
   a first power supply circuit for generating a dc pulse including a dc power supply and at least one switching element;
   a conversion means disposed between the first power supply circuit and the machining gap for converting the dc pulse into an ac pulse, said conversion means comprising a ring core, a primary winding wound around the ring core and connected to the first power supply circuit, and a secondary winding wound around the ring core and connected to the machining gap;
   a bypass path for connecting the first power supply circuit to the gap;
   a first switching means disposed between the first power supply circuit and the machining gap for selectively switching between the conversion means and the bypass path;
   a second power supply circuit including at least one switching element and a serial circuit including a current limiting resistor and a switching element;
   a pulse generating means, connected to the switching elements of the first and second power supply circuits, for delivering a stream of pulses thereto; and
   a second switching means disposed between the first power supply circuit and the machining gap, for connecting the second power supply circuit to the machining gap via the bypass path when the bypass path is connected to the machining gap, and for disconnecting the second power supply circuit from the machining gap when the conversion means is connected to the first power supply circuit.

2. The power supply system according to claim 1 wherein the power supply system supplies machining pulses having an ON time in the range of about 50~1,000 ns and an OFF time in the range of about 500~10,000 ns.

3. The power supply system according to claim 1, further comprising a third power supply circuit including a dc power supply and a switching element, said third power supply circuit being connected in parallel to the first and second power supply circuits.

4. The power supply system according to claim 1, wherein the first switching means comprises a butt contact switch.

5. The power supply system according to claim 1, wherein the second switching means comprises a butt contact switch.

6. The power supply system according to claim 1, wherein the second switching means comprises at least two switches and further comprising a relay circuit for switching said at least two switches simultaneously.

7. The power supply system according to claim 1, wherein said pulse generating means is responsive to a command signal and said relay is driven by a signal based on said command signal.

8. The power supply system according to claim 1, wherein said first and second power supply circuits include a pair of common terminals and further comprising a cable including a first conductor, one terminal of which is connected to one of said common terminals, and a second conductor, one terminal of which is connected to the other of said common terminals, said first and second conductors having low inductance to generally maintain the pulse waveform of the generally pulse which flows through the switching elements of said first and second power supply circuit during transmission to the vicinity of the machining gap.

9. The power supply system according to claim 8, wherein the cable comprises a coaxial cable.

10. The power supply system according to claim 8, wherein the cable comprises a shielded cable.

11. The power supply system according to claim 1, wherein the conversion means and the first switching means are disposed in a housing positioned proximate to the machining gap.

12. The power supply system according to claim 1 further comprising a detection circuit for detecting machining gap voltage, said detection circuit being connected in parallel with the machining gap and including an output means for converting an electrical signal into an output optical signal.

13. The power supply system according to claim 1, further comprising a first detection circuit connected in parallel to the machining gap for detecting a dc voltage at the machining gap and a second detection circuit connected in parallel to the machining gap for detecting an ac voltage at the machining gap.

14. The power supply system according to claim 13 further comprising a third switching means for connecting the first detection circuit to the machining gap and for disconnecting the second detection circuit from the machining gap when the bypass path is connected to the machining gap, and for disconnecting the first detection circuit from the machining gap and connecting the second detection circuit to the machining gap when the conversion means is connected to the first power supply circuit.

15. The power supply system according to claim 14, wherein said switching means includes a butt contact switch.

16. A power supply system for an electric discharge machine having a machining gap formed between a tool electrode and a workpiece electrode, comprising:
   a first power circuit including a dc power source and a switching element, said first power circuit comprising a low resistance circuit;
   a dc to ac conversion device including a ring core, a primary winding and a secondary winding wound on said ring core, said primary winding being selectively connectable to said first power circuit, and said secondary winding being selectively connectable to said machining gap;

a bypass path for bypassing said conversion device and connecting said first power circuit directly to said machining gap;

a first switching device for selectively connecting said first power circuit to the machining gap either via the conversion device or the bypass path;

a second power supply circuit including a series connected dc power source, a switching element and a current limiting resistance; and a second switching device for connecting said second power supply circuit into said power supply system when said first power supply circuit is connected to said machining gap via said conversion device.

17. The power supply system according to claim 16, further comprising a pulse generator connected to deliver gate pulses to the switching elements of said first and second power circuits whereby said power supply system delivers a machining pulse to said machining gap having an ON time in the range of about 50~1,000 ns and an OFF time in the range of about 500~10,000 ns.

18. The power supply system according to claim 16, wherein the first and second switching devices each include butt contact type switches.

19. The power supply system according to claim 16, further comprising a first spark detection circuit connected across the machining gap for detecting a dc voltage across the machining gap, and a second spark detection circuit connected across the machining gap for detecting an ac voltage across the machining gap.

20. The power supply system according to claim 19, further comprising a third switching device for connecting the first spark detection circuit across the machining gap and disconnecting the second spark detection circuit from the machining gap when the first power circuit is connected to the machining gap via the bypass path, and for disconnecting the first spark detection circuit from across the machining gap and connecting the second spark detection circuit across the machining gap when the first power circuit is connected to the machining gap via the conversion device.

* * * * *